United States Patent [19]
Ament

[11] Patent Number: 5,551,726
[45] Date of Patent: Sep. 3, 1996

[54] SAFETY NET SYSTEM FOR A MOTOR VEHICLE TO SEPARATE A CARGO COMPARTMENT FROM A PASSENGER COMPARTMENT

[75] Inventor: Eduard Ament, Aichwald, Germany

[73] Assignee: Baumeister +Ostler GmbH & Co., Aichwald, Germany

[21] Appl. No.: 304,246

[22] Filed: Sep. 12, 1994

[30] Foreign Application Priority Data

Oct. 25, 1993 [DE] Germany .......................... 43 36 380.6

[51] Int. Cl.⁶ ................................................. B60R 21/06
[52] U.S. Cl. ........................................ 280/749; 296/24.1
[58] Field of Search .................................. 280/749, 748; 296/24.1; 410/129, 135, 136; 244/121

[56] References Cited

U.S. PATENT DOCUMENTS

| | | | |
|---|---|---|---|
| 1,936,251 | 11/1933 | McCullough | 280/749 |
| 5,085,382 | 2/1992 | Finkenbeiner | 244/121 X |

FOREIGN PATENT DOCUMENTS

| | | | |
|---|---|---|---|
| 0467340 | 1/1992 | European Pat. Off. | |
| 2050331 | 4/1972 | Germany . | |
| 0287230 | 2/1991 | Germany | 280/249 |
| 4010209A1 | 10/1991 | Germany | 280/749 |
| 4239470 | 5/1994 | Germany | 280/249 |
| 1195445 | 6/1970 | United Kingdom . | |

OTHER PUBLICATIONS

"Schutz der Insassen vor eindringender Ladung beim Unfall", 180 ATZ—Automobiltechnische Zeitschrift 88 (1986) Nov., No. 11, Stuttgart, W. Germany, pp. 641–648.

*Primary Examiner*—Christopher P. Ellis
*Attorney, Agent, or Firm*—Frishauf, Holtz, Goodman, Langer & Chick, P.C.

[57] ABSTRACT

To ensure that a cross element forming an attachment tube or rod (18) extending across the back portion of a motor vehicle, can absorb energy if an object impinges against a net (14) suspended from the attachment rod or tube, a tubular insert element (24) is located in a chamber formed in the end of the cross element, to which a kinetic energy absorbent deformation structure is coupled. The deformation structure may be another tubular body (25), for example a plastic injection-molded part. A shaft (36) having a coupling end for attachment to a holding bracket for coupling the cross element to the vehicle is formed with radially projecting ears (46) which, upon impingement of an object against the net, will cause the shaft to withdraw into the deformation body (25), causing deformation thereof and thereby absorbing kinetic energy. A spring (41), under normal conditions, holds the shaft in one of two extreme positions. The deformation body and the insert element (24), being of plastic, receive the shaft snugly, thereby preventing rattles; the presence of the spring additionally ensures that no rattles occur upon movement of the vehicle.

24 Claims, 6 Drawing Sheets

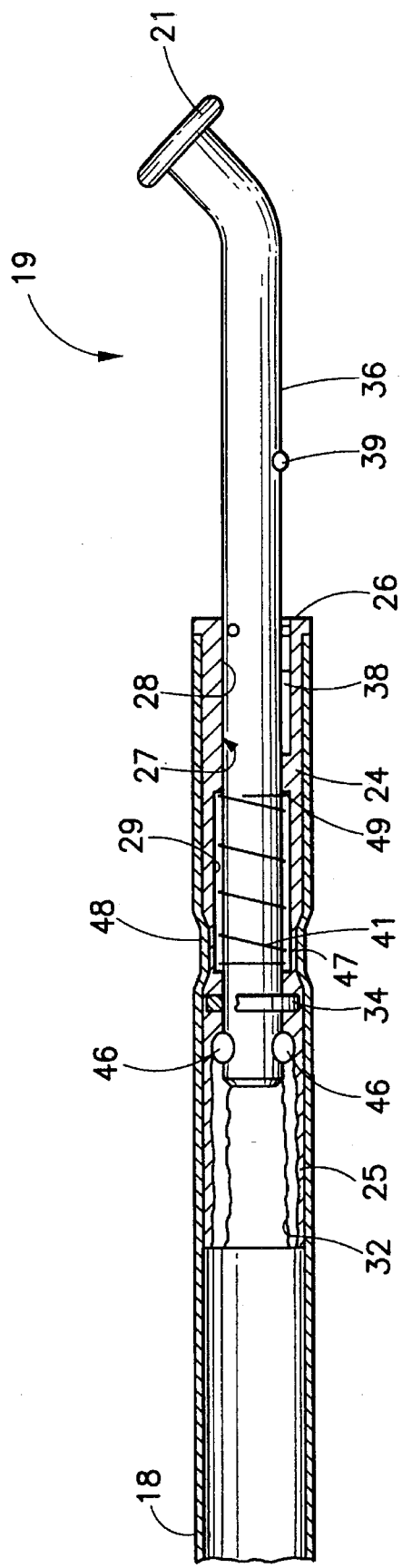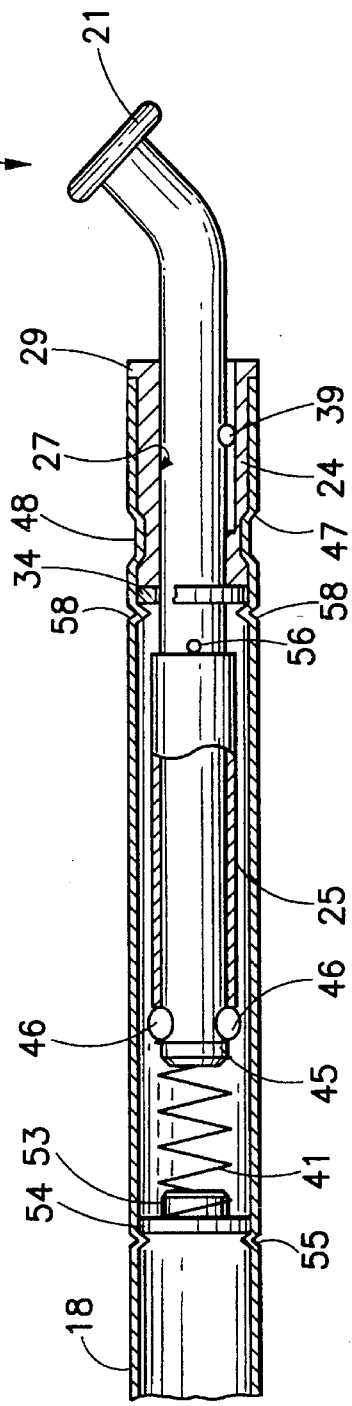
FIG. 7
FIG. 8

SAFETY NET SYSTEM FOR A MOTOR VEHICLE TO SEPARATE A CARGO COMPARTMENT FROM A PASSENGER COMPARTMENT

Reference to related publication, assigned to the assignee of the present invention: German Patent Publication DE-OS 40 10 209, Ament. Reference to related application, the disclosure of which is hereby incorporated by reference, assigned to the assignee of the present application: U.S. Ser. No. 08/279,999, filed Jul. 25 1994, now Pat. No. 5,437,474, Aug. 1, 1995.

FIELD OF THE INVENTION

The present invention relates to an arrangement for a safety net between a passenger compartment and a cargo compartment of a vehicle, such as a stationwagon, a combination van or the like, and more particularly to an arrangement which permits absorption of energy in case objects from the cargo compartment become dislodged upon abrupt deceleration of the vehicle, for example during a collision.

BACKGROUND

German Patent Publication DE-OS 40 10 209 discloses a safety net arrangement that is intended to prevent objects from the cargo compartment of a passenger car or a van, hatchback or stationwagon type from being thrown into the passenger compartment, where they could injure people, in the event of a head-on collision. This known safety net arrangement comprises a safety net that is secured along one edge to a wind-up shaft that is rotatably supported in a housing to be secured to the seat back of the rear seat. The opposite edge of the safety net arrangement is provided with a loop through which a crosspiece in form of a tubular tie bar extends, and mushroom-shaped retaining members protrude from the tie bar at both ends. The mushroom-shaped retaining members are slidable longitudinally in the tie bar and are suspended by the heads of the mushrooms in suitable receptacle pockets under the roof of the car.

Adjoining the heads of the mushrooms, each retaining member is provided with a cylindrical stem, which widens radially in conical fashion on its end plugged into the tie bar. Two groups of beads or ribs pressed into the tie bar reduce the inside diameter of the tie bar towards the outside diameter of the cylindrical stem, so that the outward motion of the retaining members caused by impact of the frustoconical thickening against the farthest inward group of beads is also limited. If a rear-end collision causes an object to be thrown out of the cargo compartment against the safety net, the tie bar bends. If the energy is high, e.g. the impact force rises further, the conical thickenings press the immediately adjacent groups of inwardly extending ribs radially outwardly, thereby converting impact energy into energy required for material deformation, in order to protect the safety net from tearing.

The known arrangement has been very successful in practice in terms of the protection function it provides. Nevertheless, it involves certain limitations from the manufacturing standpoint.

In the final analysis, the wall thickness of the tube used for the tie bar depends, in each individual case, on the requisite resistance to kinking. The wall thickness of the tube varies in accordance with the width of the safety net and thus influences the stability of the ribs and consequently the work to be brought to bear in deforming the ribs or beads as well as when the force-limiting action occurs. The force-limiting action should, however, be largely independent of the safety net.

In the known structure, the ribs cannot be pressed into the tubular tie bar until after the retaining elements have been placed into the tie bar. This means that in the impressing or stamping operation, work must be done without a die, resulting in relatively wide tolerances, which in turn lead to tolerances in energy absorption. The incident tolerances upon impressing of the rib, in combination with the required radial depth of the ribs for bringing the desired force-limiting action to bear, can easily lead to excessive radial play of the retaining element stem, causing rattling noises.

The conical thickening must be produced as a separate part that is later mounted on the stem of the retaining member. This considerably increases production costs.

THE INVENTION

It is the object of the invention to provide a safety net arrangement that permits economical manufacture while being essentially rattle-free.

Briefly, the tie bar or cross bar is a hollow tubular member or tubular at least in a portion at one end thereof. The tubular portion defines a chamber therein, coaxial with an attachment element, extending from one end of the rod-shaped attachment element internally thereof. A tubular insert element is provided, located in the chamber and secured therein. The attachment element is an elongated holding element, with a vehicle coupling head, for example in mushroom shape, for releasably coupling thereof to the motor vehicle is provided, the holding element having a shaft-like portion at the other end which is received in the tubular insert element. It is movable therein between two terminal positions.

In accordance with a feature of the invention, a resilient element such as a spring is located between the insert element and the holding element, having the mushroom end coupled to the vehicle, and arranged to bias the holding element with respect to the insert element to one of a terminal position.

In accordance with another feature of the invention, a kinetic energy absorbent arrangement is provided formed as an interengagement region between the tubular insert element and the shaft-like portion of the holding element for interengagement upon forced relative movement of the shaft-like portion, coupled to the vehicle, within the chamber due to abrupt deceleration of the vehicle, for example due to a collision.

Use of a tubular insert element has the advantage that, first, the holding portion of the entire arrangement, that is, the attachment part which can be releasably coupled to the vehicle and which terminates in the shaft-like extension, can be premanufactured. After this premanufacturing step, it is assembled to the insert element and this subassembly is then located in the chamber of the hollow tubular end portion of the shaft. It can then be readily secured in this chamber, for example by deformation of the tubular portion of the crosspiece or cross rod. Separate manufacture of the insert element permits close tolerance with respect to the opening therein into which the shaft of the holding element is secured. This effectively eliminates rattles. Of course, use of the spring also eliminates rattles. The construction in accordance with the present invention permits easy combination with energy-absorbing devices which can convert kinetic energy which occurs upon impingement of objects against the nets and convert this energy into the force necessary for deformation of the interengaging parts.

In accordance with a feature of the invention, the energy-absorbing means or arrangements can easily be made to be effective between the insert element and the holding element, or can be located in an extension of the insert element in the direction towards the center of the overall attachment arrangement.

Very simple structural conditions and economical manufacture are obtained if the fastening device is formed by a cylindrical tube that contains at least one insert piece at one of its ends. Furthermore, it is possible to provide a rigid unmovable fastening device at the other end of the cylindrical tube and to provide the movable guidance for compensation of tolerances of a car body only at one end of the cylindrical tube.

Rattling is avoided when the movable fastening device within the insert piece is biassed by means of the spring towards an end position, for example to the fully retracted position or to the fully extended position. The spring member can be situated in a respectively enlarged part of the opening of the insert piece. The fastening device and the insert piece are preferably secured against rotation when the mushroom-shaped ends of the fastening device are, as is customary, shaped in an angled fashion. For the purpose of inhibiting rotation, a groove is provided in the insert piece and a radially extending protrusion is situated on the shaft of the fastening device.

The easiest way for locating the insert piece or element within the rod-like fastening device is to impress beads or ribs into the fastening device that engage with respective recesses or grooves provided at the circumferential surface of the insert piece. Since these ribs only provide for holding and positioning of the insert piece or element, no problems arise with respect to tolerances when punching the ribs.

The energy-dissipating means mentioned above most simply consists of the tubular insert constructed as a deformation body or region having the shape of a tube or a sleeve. It is located at the end situated away from the outer end of the insert piece and through which the shaft of the fastening device extends. The shaft is provided with a thickening at the end that extends through the deformation body or region. Such a thickening can easily be obtained by projections that result from localized deformations of the normally cylindrical shaft, e.g. by stamping the shaft to punch out projecting ears therefrom. These ears are obtained by moving two cylindrical tools towards one another, thus squeezing material at the circumference outwardly while the tools approach each other.

The deformation body can be a separate member, separated therefrom; or unitary therewith, and forming a deformation region. Preferably, the insert piece is an integrally formed piece. In the case of an integrally formed piece, it is possible to mold both the deformation body as well as the insert piece of plastics, as for example nylon, polypropylene, and other suitable thermoplastics, with or without filler material.

A progressive increase of force can be obtained by conically narrowing the opening provided in the deformation body in the direction towards the insert piece.

DRAWINGS

FIG. 7 shows a view of the end of the tie rod according to FIG. 5 after deformation;

FIG. 8 shows a longitudinal sectional view of another embodiment of the end of the tie rod, according to FIG. 1, having a separate deformation body.

DETAILED DESCRIPTION

Figure 1:
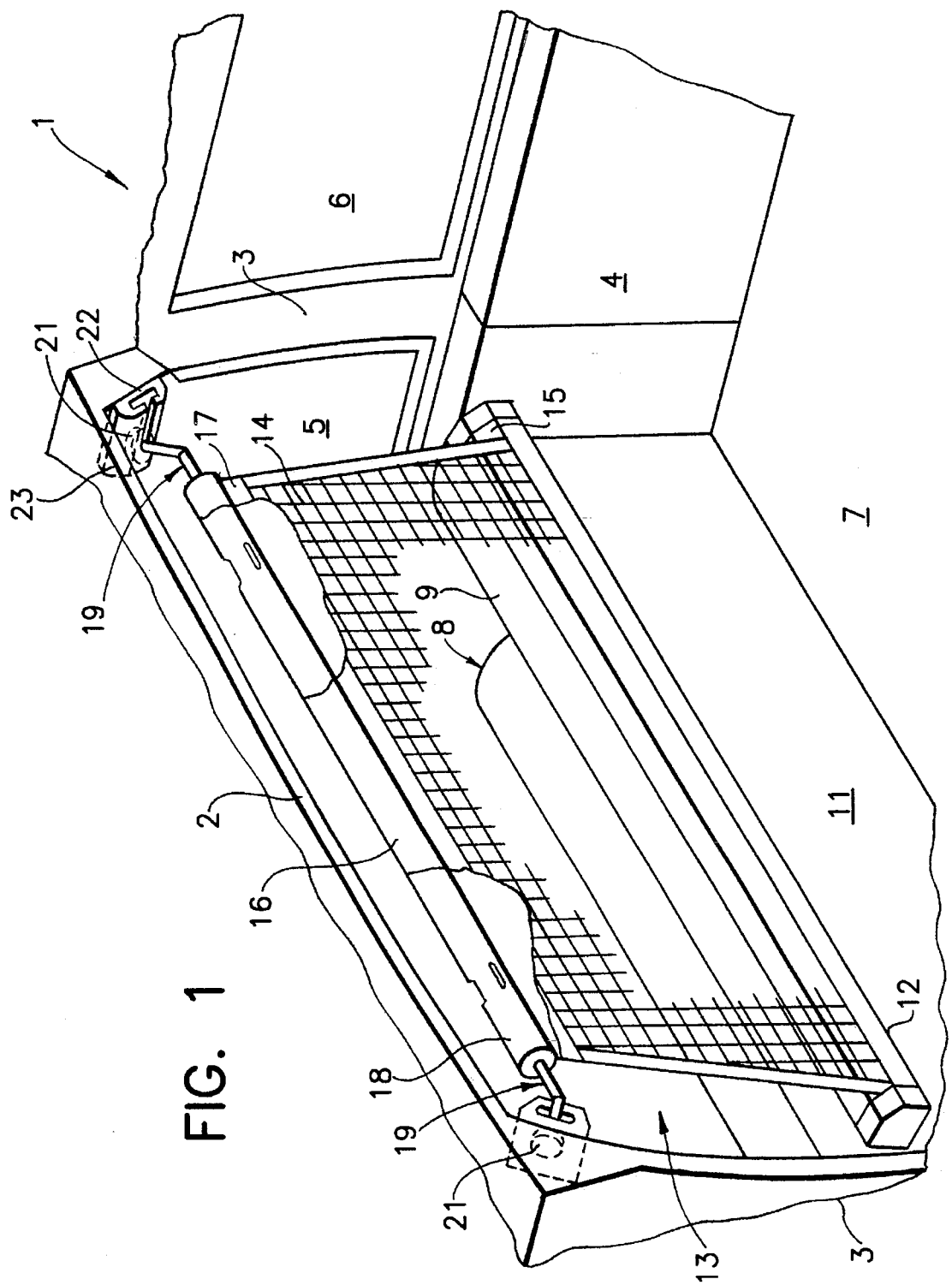
FIG. 1 is a highly schematic perspective view of the safety net strung tautly suspended between the roof of a car and the back support of the rear seat, with a car body partially broken away.

FIG. 1 is an illustration of a rear end region 1 of a passenger car of the hatchback or stationwagon type. The rear end region 1 is illustrated as a view from a left rear side window. It also shows the car roof carried laterally by two C-pillars, posts or columns 3. A rear side window 5 is located in front of the C-pillar 3 and beneath the roof 2 while a rear side window 6 is located therebehind. The side windows 5 and 6 of the left side are arranged symmetrically to those illustrated on the right side. The rear end region 1 is closed off at the bottom by an essentially planar cargo compartment platform 7.

A rear seat 8 is located between both rear side windows 5 which comprises a rear seat back support 9 having a back side 11 which is located essentially between both C-posts 3. An elongated housing 12 of a safety net arrangement 13 is located at the back side 11 of the back support 9. The housing 12 extends approximately horizontally and practically along the entire longitudinal extension of the rear seat back support 9. A wind-up shaft is rotably supported in a well-known manner within the elongated box-like housing 12. A safety net 14 is mounted with its longitudinal edge at the wind-up shaft so that the safety net can be selectively driven through a slot 15 of the housing 12 into the housing 12 and out of it, respectively. The net is rolled into housing 12 by a wind-up shaft mounted by means of bearings within the housing 12. The spring motor is biassed in the wind-up direction.

The safety net 14 has a front edge 16 that is parallel to the wind-up shaft within the housing 12 and a loop 17 extending along the front edge 16. The loop 16 is attached to the car by a tubular rod 18, located within the loop 17 and with fastening devices 19 which protrude therefrom on both sides. The fastening devices 19 have mushroom-shaped heads 21 at their free ends. These heads 21 can be inserted in T-grooves 22 of pocket-shaped sockets 23 when the safety net 14 is extended. The pocket-shaped sockets 23 are located somewhat beneath the roof 12 approximately at the level of the back side 11 within the end region 1. The tubular rod 18 preferably is a relatively thin walled tube.

Figure 2:
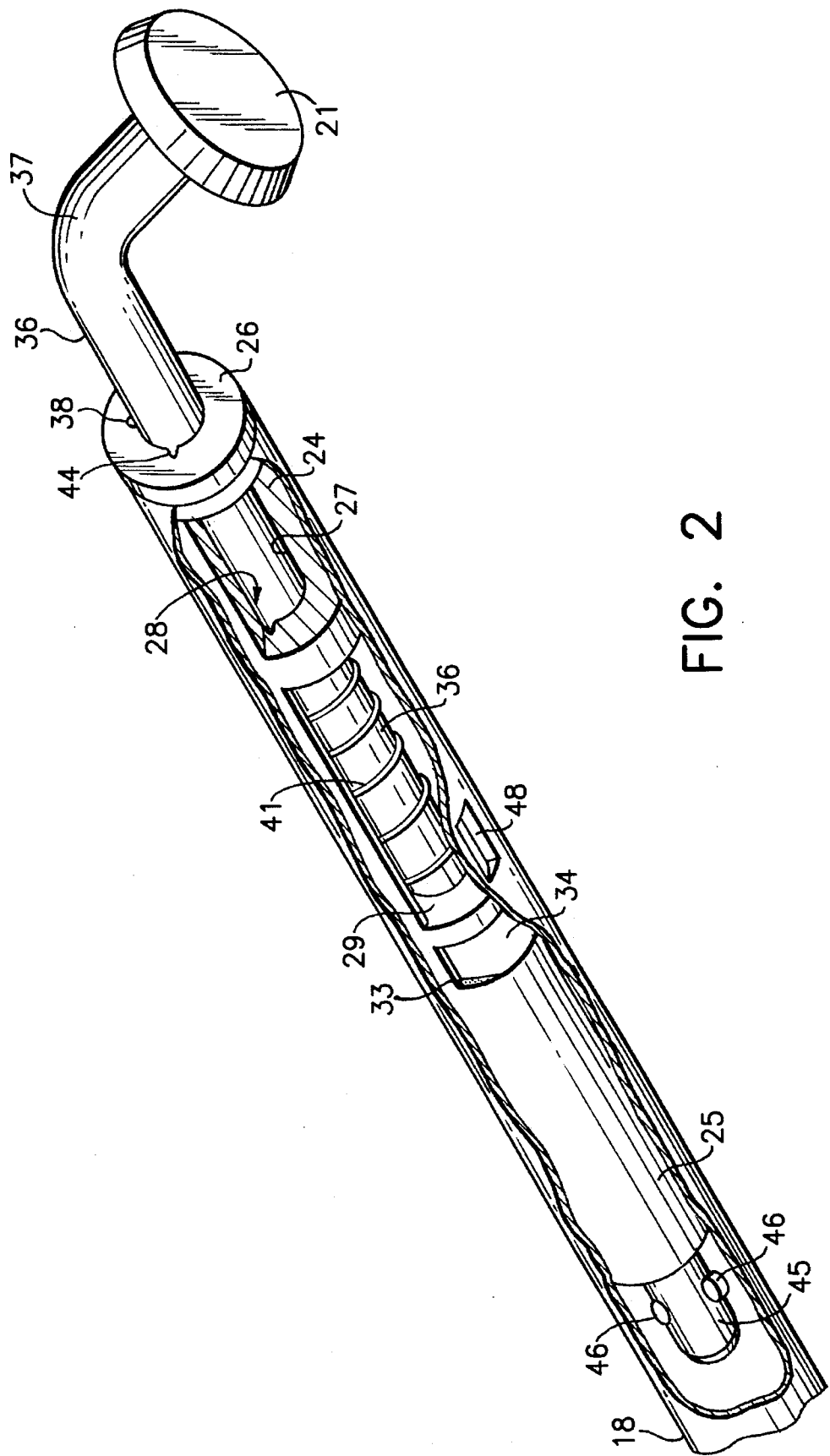
FIG. 2 shows a perspective view of an end of the tie rod of the safety net shown in FIG. 1, and partially broken away.
Figure 4:
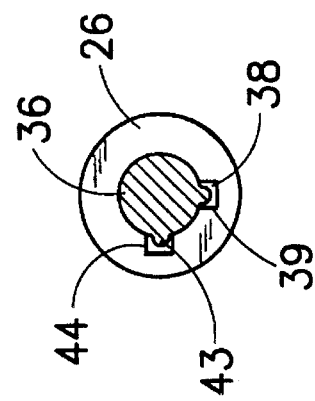
FIG. 4 shows a cross-sectional view along line IV—IV of the end of the tie rod according to FIG. 3.

FIGS. 2 and 4 show how the fastening devices 19 are mounted within the tube 18, which can also be termed a tubular rod.

In accordance with a feature of the invention a cylindrical tubular insert piece 24 is located within the relatively thin-walled tube forming the rod 18. The insert piece 24 is integrally formed with a deformation body 25 that is also formed in tubular shape. Both the insert piece 24 as well as the deformation body 25, which can be considered a portion of insert body 24, have a cylindrical surface fitting the inner diameter of the tube forming the rod 18 so that they are located essentially without radial play within the rod 18. The insert piece 24 has a collar 26 which abuts at the free front face of the rod 18 when mounted at its exterior front end.

A bore 27 which is coaxial with the rod 18 and which is a cylindrical portion 28 starting at the collar 26 extends through the insert piece 24 as well as through the deformation body. The cylindrical portion 28 is followed toward the middle of the rod 18 by a portion 29, having a wider width, and which portion 29 ends at a portion 31 that in turn has the diameter of the portion 28. The imaginary transition from the insert piece 24 to the deformation body 25 is situated approximately within the bore 27 which provides a conically enlarged portion 32. The enlarged portion 32 is located in such a way that the portion having the smallest diameter lies adjacent to the portion 31.

A pocket 33, open in radial direction, is located between the portions 32 and 31 of the bore 27 of a body which is formed by the deformation body 25 and the insert piece 24 and an annular steel ring 34 is inserted from the left side into the pocket 33 which ring 34 has an inner bore with a diameter which equals the diameter of the bore portion 28.

The fastening device 19 is provided with an elongated cylindrical shaft 36 that is located in the bore 27. The cylindrical shaft 36 is angled at reference numeral 37 in the way the car body requires, and the shaft 36 has at its free end the mushroom-shaped head 21 which is obtained by upsetting or forging.

The fastening member 19 should only be displaceable axially, but not rotatable. Therefore, the insert member 24 is provided with a rotation-preventing assembly which is formed by a groove 38 provided within the bore portion 28 in axial direction and a radially extending part 39 that is integrally formed with the shaft 36. The part 39 is a projection generated by punching and shaped like an ear that is punched out of the shaft 36 and that has a circular base face so that a protrusion is generated which is approximately semicircular.

In order to ensure that the shaft 36 can be inserted into the insert piece 34, the groove 38 is open at the end face of the insert body 24 carrying the collar 26.

The enlarged portion 29 of greater diameter is open at its side over its entire length (shown in FIG. 2) to permit insertion of a coil spring 41 into the portion 29 which acts as a pressure spring. The coil spring 41 is adapted to bias the fastening device 19 toward its end position in view of the insert piece 24, especially into the end position where the fastening device 19 protrudes the most. Therefore, the coil spring 41 abuts at an inner annular shoulder 42 which provides the inner end of the bore portion 29.

A further radial bulge 43 generated by punching is adapted as an abutment member for the coil spring 41 that is located at the fastening device 19. In order to permit passage of the part 43 through the bore portion 28, the bore portion 28 has a further groove 44 that extends in axial direction through the bore portion 28 over its full length, thereby reaching the bore portion 29.

Figure 3:
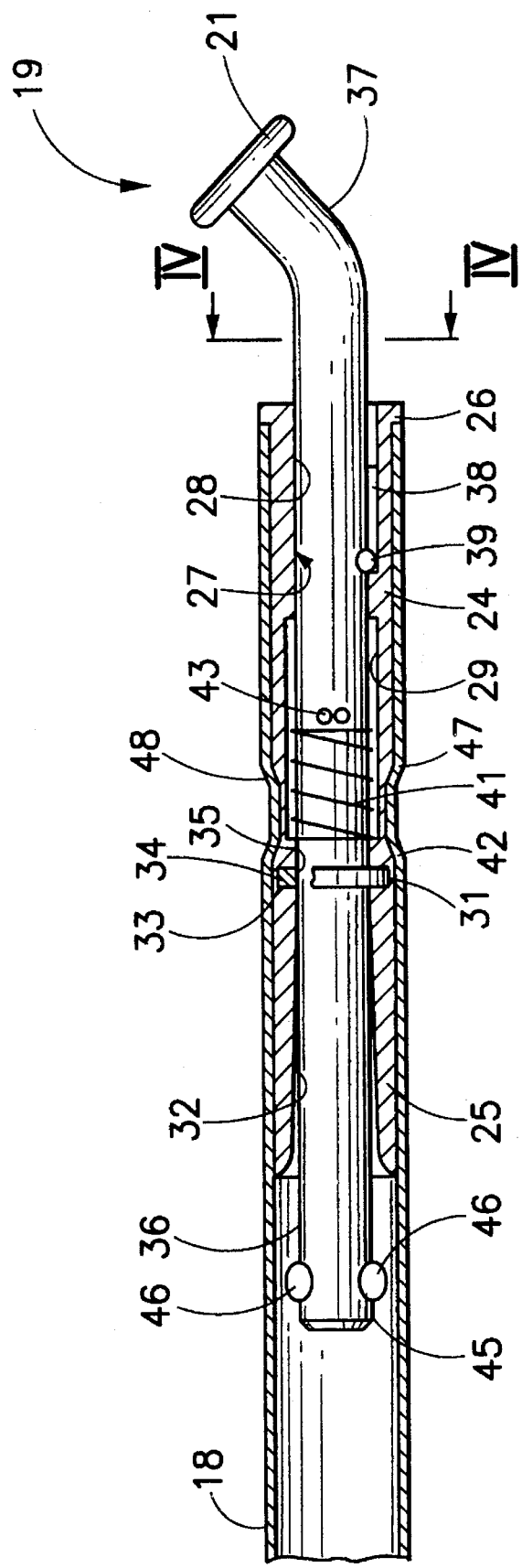
FIG. 3 shows a cross-sectional view of the end of the tie rod according to FIG. 2, with the fastening device partially retracted.

As shown in FIG. 3, the shaft 36 has a length exceeding the entire length of the body consisting of the insert body 24 and the deformation body 25 so that that the inner body 45 of the shaft 36 protrudes from the bore 27 and the deformation body 25, respectively. By crushing or stamping the shaft 36, two radially extending protrusions 46 are provided at the protruding end 45 that are disposed diametrically to each other, the part of the shaft 36 that extends beyond its circumferential face has a semicircular shape. Furthermore, the two radial protrusions 46 form abutment members that prevent the fastening device 19 from falling out of the tie rod 18.

For axially securing the insert body 24 within the tie rod 18, two pocket-shaped recesses 47 are disposed at the circumference; the beads 48 that are impressed into the tube forming the tie rod 18 engage the recess 47.

Assembly of the tie rod 18:

The fastening device 19 on which the mushroom-shaped head 21 and the angled portion 37 are provided will be crushed to form the radially extending protrusions 39 and 43 but not the protrusions 46, so that the shaft 36 will be cylindrical and smooth beginning at the part or protrusion 43.

Figure 5:
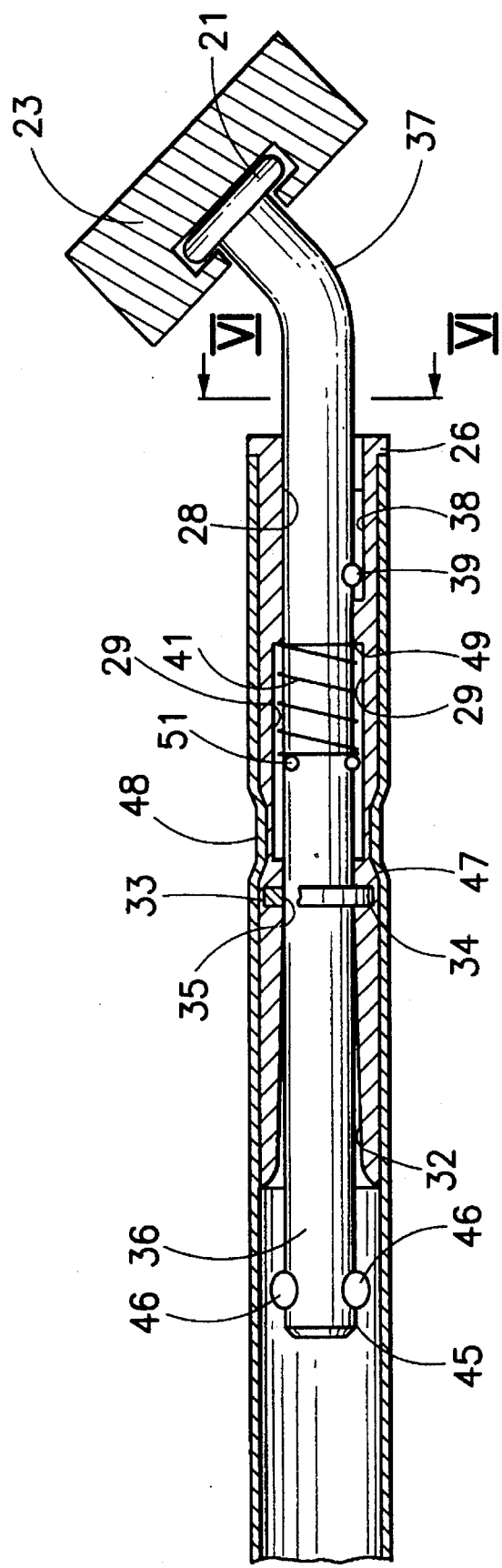
FIG. 5 shows a longitudinal sectional view of another embodiment of the end of the tie rod having a fastening member that is charged by tensile stress.

Thereafter, the coil spring 41 is fitted from the side through the respective opening into the body which forms the insert piece 24 as well as the deformation body 25 and in the same manner the steel ring 34, which can be a C or snap ring, is fitted, in radial direction with respect to the bore 27, into the respective pocket of the bore 27. Thereafter, the shaft 36 of the fastening device 19 is introduced into the bore 27 from the end face carrying the collar 26, the radial protrusion 43 thereby sliding through the groove 44 in the bore portion 29. At the same time the radial protrusion 39 enters the groove 38 to secure the fastening device 19 in order to prevent the insert piece 29 from turning. Hence the assembly illustrated in FIG. 5 is obtained.

In a further operation, the rear end 45 is punched or stamped within a respective apparatus to generate the two radial parts or bulges 46. The outer distance between the two radial bulges 46 exceeds the widest diameter of the conical bore portion 32. Thus the fastening device 19 cannot fall out of the insert piece 24.

The premanufactured assembly consisting of the insert piece 24 and the fastening member 19 is then inserted into the tube that forms the tie rod 18 so that the collar 26 abuts at the end face of the tube. Then, the beads or ribs 48 are punched into the pocket-shaped recess 47 thereby fixing the insert piece 24 and the deformation body 25 that is integrally formed and situated within the tie rod 18.

The arrangement described above may be provided at both ends of the tie rod 18 or at one end only, while at the other end the fastening device 19 is fixedly connected directly to the tube forming the tie rod 18.

The other tie rod 18 is secured to the safety net 14 in known manner.

It is intended, in normal use, that the safety net 14 can be pulled out of the housing 15 against the force of the wind-up shaft and that the tie rod 18 with both its fastening devices 19 can be inserted into the respective pockets 23. For this purpose either one fastening device 19 or both fastening devices 19 must be retracted a little distance. FIG. 3 illustrates the fully retracted position in which the radial protrusion 39 abuts at the inner end of the groove 38.

Operation:

During a head-on collision, objects can be projected out of the cargo compartment into the safety net 14. The tie rod 18 may bend under the force of the impact, and a part of the kinetic energy transforms to deformation work. At the same time the distance between the ends of the tie rod 18 will decrease and the shafts 36 of the fastening devices 19 will obtain a component of movement in the direction of the load projected against the safety net 14. In case that not all energy is dissipated during bending of the tie rod 18, the radial protrusions 46, upon movement of shaft 36, will form or cut a groove extending through the deformation body 25 by cutting into the wall of the conical portion 32 and by sliding in the direction towards the steel ring 34. This step is illustrated in connection with a somewhat modified assembly in FIG. 7. The deformation of the deformation body 25 transforms further kinetic energy of the object impacting on the safety net 14 to deformation work and therefore the deformation body 25 acts as an energy-dissipating means.

The function of the steel ring 34 is to ensure that the fastening device 19 cannot slip out of the tie rod. Its inner diameter is determined in accordance with the outer diameter of the shaft 36; the radial protrusions cannot perforate the steel ring 34. Only when extremely large tensile forces occur which exceed the stress range defined by safety rules, it may happen that the steel ring 34 shears off the radial protrusions 46 or that the steel ring 34 deforms accordingly.

Because of the fact that the steel ring 34 is situated at the inside, especially in view of the beads 48, it will be held in place without dependence on the resilience of the insert body 24.

The insert body 24 and the deformation body 25 can be made of suitable thermoplastics, such as polypropylene, nylon, etc. The wall 27 can be designed, in view of the diameter of shaft 36, with a small tolerance, thereby preventing rattling. Furthermore, this permits to very precisely define the force which is required for pulling the fastening device 19 out of the deformation body 25 by force. Thus, the impact stress characteristics of various safety nets vary only within a narrow range, rather than having widely scattered stress characteristics, and their reliability is significantly increased. Further, the manufacturing process is essentially simplified because the assembly may be produced by pre-assembling the insert piece 24 and the fastening device 19. The beads 48 of the safety net 14 do not influence its function.

Figure 6:
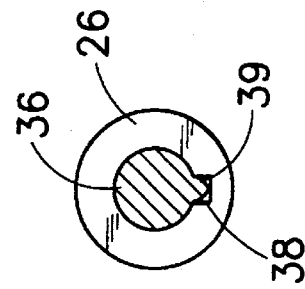
FIG. 6 shows a cross-sectional view along line VI—VI of the end of the tie rod according to FIG. 5.

The embodiment shown in FIGS. 5, 6 and 7 essentially differs from the embodiment described above only insofar as the coil spring 41 is so located that it causes the fastening device 19 to be drawn into the tie rod 18 as far as possible. For this purpose the coil spring 41 is arranged such that it pushes itself away from the shoulder 49 where the wall portion 29 borders on the wall portion 28. A cylinder pin 51 extending through a traverse bore of the shaft 36 is adapted to serve as an abutment. The bore provided for the reception of the cylinder pin 51 is located at a respective position.

During assembly the cylinder pin 51 will be inserted into the lateral opening which leads into the bore portion 29. Grooves like groove 44 do not exist and in case of a collision the protruding parts of the cylinder pin 51 will become sheared off as schematically shown in FIG. 7.

The other parts are similar to those of the embodiment described above and have been given similar reference numerals.

Figure 9:
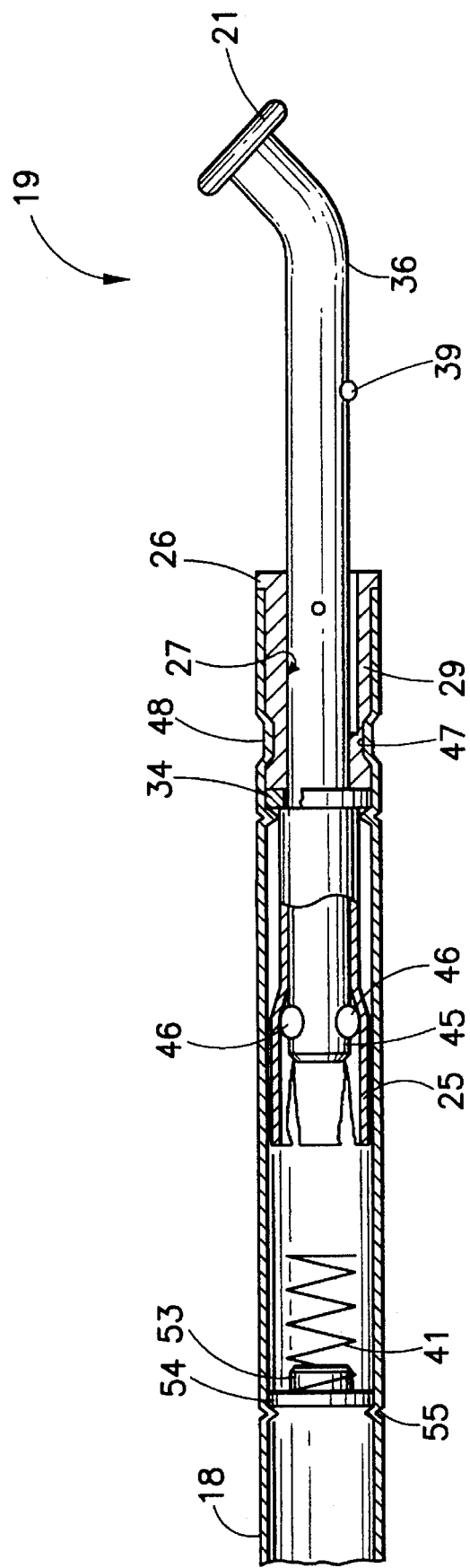
FIG. 9 shows a view of the assembly according to FIG. 8 after deformation.

The embodiment of FIGS. 8 and 9 comprises a deformation body 25 that is a discrete steel tube separated from the insert piece 24. The parts of the embodiment of FIGS. 8 and 9 which are similar in function to the preceding embodiments have been given similar reference numerals.

As can be seen, the insert piece 24 ends approximately at a point where, according to the previous embodiments, the inner end of the bore portion is situatated. The pocket-shaped recesses 47 are accordingly displaced toward the front and the steel ring 34 abuts at the inner front end of the insert piece 24.

The coil spring 41 acts on the rear end 45 of the shaft 36 and a plate 54 having a central protrusion 53 serves as an abutment which pushes itself away from the beads 55 punched into the tie rod 18. The other end of the coil spring 41 abuts at the two radial protrusions 46.

For assembling the embodiments of FIGS. 8 and 9, first the insert piece 24 will be stuck onto the shaft 36 provided with the radial protrusion 39 and then the steel ring 34 will be placed thereon. Further, a pin 56 will be pushed into a respective lateral bore and then the deformation body, in form of a piece of a steel tube, will be pushed thereon via the rear end. Thereafter the radial protrusions 46 will be generated by punching.

The coil spring 41 has a width that is preferably somewhat smaller than the diameter of the shaft 36 so that it can be pushed onto the rear end and fixedly adhered thereto by friction. Eventually the protrusion 53 will be stuck into the coil spring 41 by a low force.

After the beads 55 are punched into the tie rod 18, the preassembly will be introduced into the tie rod 18 for a short distance. Thereafter, further beads 58 serving as an abutment for the steel ring 34 will be impressed at a distance from the beads 55. After impressing the beads 58, the insert piece 24 will be fully inserted so that its collar 24 abuts the tie rod 18. Thereafter, the beads 48 will be impressed into the tie rod 18 for holding the insert piece in place. The steel ring 34 is now located between the bead 58 and the inner end face of the insert piece 24 without any clearance.

Operation of embodiment of FIGS. 8 and 9:

In the event of a collision, the shaft 36 will be torn outwardly from the tie rod 18 causing the radial protrusions to enter into the steel tube and to deform it. During this deformation step, the steel tube forming the deformation body will be pressed onto the steel ring 34 that pushes itself away from the insert body 24 which is fixed within the tie rod by the beads 48.

The steel ring 34 will shear off the pin 46 during tearing of the fastening device 19 out of the tie rod 18.

As explained above, kinetic energy will be transformed to deformation work within the deformation body 25.

Various changes and modifications may be made, and any features disclosed herein may be used with any of the others within the inventive concept.

I claim:

1. Safety net system for combination with a motor vehicle to separate a cargo compartment of the vehicle from a passenger compartment and to prevent cargo from the cargo compartment to penetrate the passenger compartment upon abrupt deceleration of the vehicle, having a safety net (14) having a pair of essentially parallel edges (16);

first attachment means (15) for connecting one edge of the safety net to the vehicle; and second attachment means for connecting another edge of the safety net to the vehicle, wherein said second attachment means comprises an elongated and essentially rod-shaped element (18) which is hollow and tubular adjacent at least one of its ends to there define a coaxial chamber, extending from the at least one end of the elongated element (18) internally thereof;

a tubular insert element (24) located in said chamber and extending from the at least one end of the elongated element (18) internally thereof and secured therein;

an internally projecting rib (48), projecting internally from the elongated element (18) into said chamber, engaging and retaining said tubular insert element (24) in the chamber;

an elongated holding element (19) having vehicle coupling means (21) at one end thereof for releasable coupling with a reception element (23) secured to the motor vehicle, said holding element (19) having a shaft-like portion (36) terminating at the other end thereof, said shaft-like portion being received in said tubular insert element (24) and movable therein between two terminal positions;

and kinetic energy absorbent means including interengagement means between the shaft-like portion (36) of the holding element (19) and the tubular insert element (24) in the chamber of said elongated element (18), for interengagement upon forced relative movement of said holding element (19) and the second attachment means due to impingement of cargo against the net and deflection of said second attachment means upon abrupt deceleration of the vehicle.

2. Safety net system for combination with a motor vehicle to separate a cargo compartment of the vehicle from a passenger compartment and to prevent cargo from the cargo compartment to penetrate the passenger compartment upon abrupt deceleration of the vehicle, having a safety net (14) having a pair of essentially parallel edges (16);

first attachment means (15) for connecting one edge of the safety net to the vehicle;

second attachment means for connecting another edge of the safety net to the vehicle, wherein said second attachment means comprises an elongated and essentially rod-shaped element (18) which is hollow and tubular adjacent at least one of its ends to there define a coaxial chamber, extending from the at least one end of the elongated element (18) internally thereof;

a tubular insert element (24) located in said chamber and extending from the end portion of the elongated element (18) internally thereof and secured therein;

an internally projecting rib (48), projecting internally from the elongated element (18) into said chamber, engaging and retaining said tubular insert element (24) in the chamber;

an elongated holding element (19) having vehicle coupling means (21) at one end thereof for releasable coupling with a reception element (23) secured to the motor vehicle, said holding element (19) having a shaft-like portion (36) terminating at the other end thereof, said shaft-like portion being received in said tubular insert element (24) and movable therein between two terminal positions;

and resilient means (41) located between the insert element (24) and the holding element (19) and biasing said holding element with respect to the insert element into one of said terminal positions.

3. The system of claim 1, further comprising resilient means (41) located between the insert element (24) and the holding element (19) and biasing said holding element with respect to the insert element into one of said terminal positions.

4. The system of claim 1, wherein said kinetic energy absorbent means comprise kinematically associated means located between the elongated element (18) and the shaft-like portion (36) of the elongated holding element (19).

5. The system of claim 1, wherein the elongated element (18) is an elongated hollow tube.

6. The system of claim 2, wherein an opening (27) defined by the tubular insert element (24) is essentially cylindrical.

7. The system of claim 6, wherein the opening (27) in the insert element (24) is formed with a diametrically enlarged portion (29) to receive the resilient means (41);

and said resilient means comprises a coil spring element.

8. The system of claim 7, wherein said enlarged portion (29) decreases in diameter towards both ends;

and wherein an opening is provided in said enlarged portion to receive the spring element.

9. The system of claim 2, including means coupled to the holding element (19) for restraining relative rotation between the holding element (19) and the tubular insert element (24).

10. The system of claim 9, wherein the means for restraining relative rotation comprises an axial groove (38) formed in the insert element (24) and a projection (39) radially extending from the holding element (19) and fitting into said groove.

11. The system of claim 10, wherein said radially extending projection (39) is a punched extension of the holding element.

12. The system of claim 10, wherein the groove (38) is open at the extreme end of the insert element (24) to permit insertion of the radial projection (39) therein.

13. The system of claim 2, wherein the insert element (24) is formed with at least one recess (47) at its outer circumference, optionally a circumferential groove, and said rib (48) formed in the second attachment means (18) being engageable in said recess (47).

14. The system of claim 2, further comprising a radially projecting flange (26) formed on the insert element (24).

15. The system of claim 1, wherein the kinetic energy absorbent means comprise a tubular deformation body (25) located within the chamber;

the shaft-like portion (36) of the elongated holding element (19) passing through the tubular insert element (24) and the deformation body (25), and having projecting portion, projecting beyond the deformation body;

and wherein a radial projection (46) is formed on the projecting portion of said shaft-like portion (36) extending beyond an end region of the deformation body (25), whereby the elongated holding element and the shaft portion (36) thereof can be withdrawn axially from the deformation body (25) only upon deformation thereof.

16. The system of claim 15, wherein said deformation body (25) and the tubular insert element (24) are coupled together and, optionally, form a unitary body.

17. The system of claim 15, further including a stop ring (34) located between the deformation body (25) and the insert element (24).

18. The system of claim 17, wherein said internally projecting rib (48), projecting internally of the elongated element (18) within said chamber is located axially outwardly of the position of said stop ring (34).

19. The system of claim 17, wherein the insert element (24) and the deformation body (25) comprise a unitary structure, formed with a circumferential recess or pocket (33); and wherein said stop ring is located in said recess or pocket.

20. The system of claim 15, wherein the radial projection (46) is formed by at least one punched-out ear-like projection from the shaft portion (36) of the elongated holding element.

21. The system of claim 15, wherein at least one of said insert element (24) and said deformation body (25) comprises an injection-molded structure or, optionally, a plurality of injection-molded structures.

22. The system of claim 15, wherein the deformation body (25) comprises a metal tube, optionally a steel tube.

23. The system of claim 15, wherein said deformation body (25) is tubular, and a tubular opening (32) thereof changes conically, optionally with a low cone angle, in a direction away from the tubular insert element (24).

24. The system of claim 15, wherein said deformation body (25) and the tubular insert element (24) is a unitary structure.

* * * * *